Dec. 20, 1949  J. R. BARNETT ET AL  2,491,546
FISHING HOOK
Filed Aug. 3, 1948
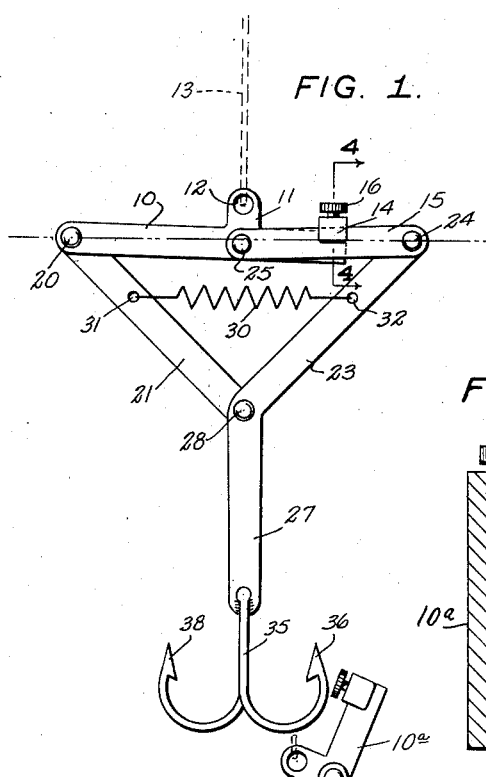
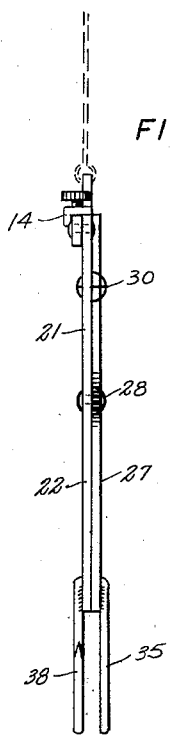
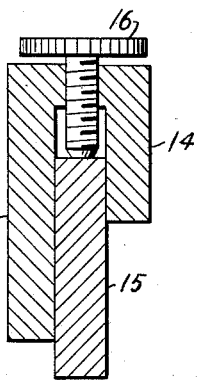
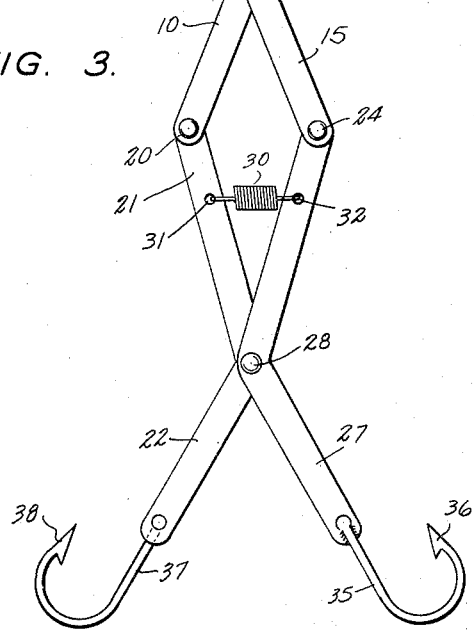
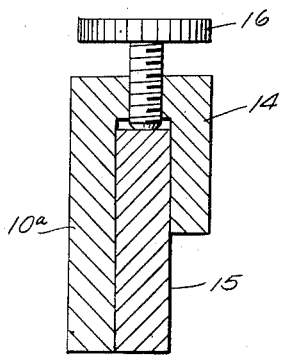
INVENTOR.
JAMES R. BARNETT,
JOHNIE D. BARNETT,
BY
McMorrow, Berman & Davidson
ATTORNEYS.

Patented Dec. 20, 1949

2,491,546

UNITED STATES PATENT OFFICE 2,491,546

FISHING HOOK

James Ralph Barnett and Johnie D. Barnett, Wynne, Ark.

Application August 3, 1948, Serial No. 42,188

3 Claims. (Cl. 43—36)

This invention relates to fish hooks.

An object of the invention is the provision of a fishing device which includes a pair of hooks adapted to be moved apart by a spreading means in the form of a lazy tongs normally maintained in an inoperative position by a spring, means being employed for controlling the ready release of the tongs, said hooks when spread apart engaging opposite portions of the mouth of a fish.

A further object of the invention is the provision of a fishing device having a pair of hooks which are spread apart to engage opposite portions of the mouth of a fish when a weight or pull is exerted on a pair of lazy tongs intercalated between a line and the hooks, one of the arms of the tongs movable into close association with another arm provided with an extension, means on the extension and engageable with the first mentioned arm for controlling the ready release of said arms when a pull is exerted on the tongs.

The invention wil be best understood from a consideration of the following detailed description in view of the accompanying drawings forming part of the specification, nevertheless, it is to be understood that the invention is not confined to the disclosure, being susceptible of such changes and modifications which shall define no material departure from the salient features of the invention as expressed in the appended claims.

In the drawings:

Figure 1 is a side view in elevation of my fishing device in an inoperative position, Figure 2 is an end view in elevation, Figure 3 is a side view in elevation of the fishing device in operative position.

Figure 4 is an enlarged transverse vertical section taken along the line 4—4 of Figure 1; and Figure 5 is an enlarged transverse vertical section similar to that of Figure 4, but showing another position of the arm and set screw.

Referring more particularly to the drawings, 10 designates a supporting arm of a pair of lazy tongs having a lug 11 provided with a passage 12 to receive one end of a line 13, said arm has a resilient flange 14 on an extension 10a adapted to receive an arm 15, the arm 15 being frictionally engaged by the flange 14 when it is aligned horizontally with the supporting arm 10. A set screw 16 threaded into an opening in the flange 14 is adjusted to vary the position of the arm 15 for a purpose which will be explained presently.

The arm 10 is pivoted at 20 to an arm 21 which has a depending leg 22 integrally formed therewith. An arm 23 is pivoted at 24 to the outer end of the arm 15. The inner end of the arm 15 is pivoted at 25 to an intermediate portion of the arm 10. A leg 27 depends vertically in an integral formation from the inclined arm 23. The arms 21 and 23 together with the respectively combined legs 22 and 27 form bent levers which are pivoted together at 28.

A coil spring 30 has one end connected at 31 to the inclined arm 21. The other end of the spring is attached at 32 to the arm 23. The spring exerts a pull on the arms tending to bring the arms together and extends the tongs as shown in Figure 3.

A shank 35 of a hook 36 is carried by the lower end of the leg 27 with the hook projecting to one side of the leg 27. A shank 37 carried by the lower free end of the leg 22 has a hook 38 projecting to one side of the leg 22 and in the opposite direction from the hook 36.

The operation of my device is as follows: The fishing device is shown in an inoperative position in Figure 1 with the shanks of the hooks 36 and 38 and the legs 22 and 27 being in alignment against the action of the spring 30. The aligned arms 10 and 15 also aid in retaining the device in an inoperative position in connection with the flange 14 and the screw 16.

When a pull is exerted on the hooks 36 and 38 by a fish after the fish has swallowed the bait and the hooks, the lazy tongs will then collapse and the legs 22 and 27 are spread apart causing the hooks to separate and engage opposite portions of the mouth of the fish, thereby firmly holding the fish.

The collapse of the tongs causes the arms 10 and 15 to form an acute angle with each other since the line 13 exerts a pull on the lug 11 and likewise the arm 10. The extension 10a on the arm 10 will separate from the arm 15. The set screw 16 may be adjusted against the arm 15 so that the arms 10 and 15 will be released readily from each other or the adjustment of the screw will restrict ready release. It will be noted from Figure 1 that the pivot 25 is located slightly below a horizontal line passing through the centers of the pivots 20 and 24 and the spring 30 aids in maintaining the pivot 25 in such position with the help of the screw 16. Thus, when the fish hook is placed in the water, the hooks 36 and 38 will be retained in close association with each other as shown in Figure 1.

The resistance to the extension of the lazy tongs from the position illustrated in Figure 1 to that shown in Figure 3 may be increased by turning the screw 16 inwardly on the arm 15 for causing said arm to be moved inwardly thereby shifting the pivot 25 downwardly to create a more perceptible angle between the arms 10 and 15 so that a greater pull will be required on the hooks 36 and 38 to extend the lazy tongs. Such variations in the release of the tongs is necessary where fish of different sizes are caught.

What is claimed is:

1. A fish hook comprising a supporting arm having a downturned flange, a second arm pivoted at one end to an intermediate portion of the supporting arm and received frictionally by the flange when said arms are aligned horizontally, a lever having a bent portion and a vertically disposed depending portion, the upper free end of the bent portion being pivotally connected to one end of the supporting arm, a second bent lever having the upper end pivoted to the other end of the second arm and the lower portion depending vertically in line with the depending portion of the first lever, means pivotally connecting the upper ends of the depending portions together, a hook carried by the lower end of each lever, and a set screw carried by the flange for causing the arms to move away from each other to vary the frictional resistance between the flange and the second arm, whereby a pull on the hooks causes the arms and the lower ends of the levers to move away from each other for spreading the hooks.

2. A fish hook comprising a lazy tongs having a pair of arms adapted to be horizontally aligned when the tongs are in an inoperative position, a flange on one arm frictionally engaging over the other arm for resisting movement of the arms relative to each other, a screw carried by the flange and adjustable for moving the arms out of horizontal alignment, levers pivotally connected together intermediate the ends thereof, the upper ends of the levers being bent outwardly from each other and forming the other two members of the lazy tongs, and a hook carried by the lower end of each lever and adapted to be spread apart by said levers when the first mentioned arms are moved to an angular position by a pull on the hooks.

3. A fish hook comprising a lazy tongs having a pair of arms adapted to be horizontally aligned when the tongs are in an inoperative position, a flange on one arm frictionally engaging over the other arm for resisting movement of the arms relative to each other, a screw carried by the flange and adjustable for moving the arms out of horizontal alignment, levers pivotally connected together intermediate the ends thereof, the upper ends of the levers being bent outwardly from each other and forming the other two members of the lazy tongs, a spring connected between the upper ends of the levers for pulling said ends towards each other when the flange is released from said other arm, and a hook carried by the lower end of each lever and adapted to be spread apart by said levers when the first mentioned arms are moved to an angular position by a pull on the hooks.

JAMES RALPH BARNETT.
JOHNIE D. BARNETT.

REFERENCES CITED

The following references are of record in the file of this patent:

UNITED STATES PATENTS

| Number | Name | Date |
| --- | --- | --- |
| 7,709 | Warner et al. | Oct. 8, 1850 |
| 671,294 | Pennock | Apr. 2, 1901 |
| 1,782,082 | Wichtendahl | Nov. 18, 1930 |
| 2,136,661 | Abel | Nov. 15, 1938 |